3,077,392
PLANT GROWTH CONTROL AND HERBICIDAL COMPOSITION AND PROCESS OF USING THE SAME
Irvin W. Bales, Westfield, N.J., assignor to Chipman Chemical Company, Inc., Bound Brook, N.J., a corporation of New York
No Drawing. Filed Jan. 8, 1959, Ser. No. 785,559
14 Claims. (Cl. 71—2.4)

This invention relates to plant growth control compositions and more particularly to weed control and herbicidal compositions consisting essentially of an alkali metal chlorate and an aminotriazine compound, and to a process for controlling weeds and other plants by application of such a composition thereto.

The control of weeds requires that the weed stand be sufficiently reduced to prevent serious competition of weeds with the desired plants. Usually, a balance is struck between, on the one hand, the cost involved in application of the weed control composition and the amount of injury that the weed control chemicals may do to the crop, and, on the other hand, the amount of injury that a good stand of weeds will do to the crop. For many purposes, however, such as in the maintenance of railroad right-of-way, complete removal or extermination of the weed species is desirable. This is usually costly, and good control of the weeds heretofore has been considered adequate. If, however, the weed control chemicals are inexpensive and at the same time exceptionally effective, so that only a small amount is necessary to achieve complete control, complete extermination or removal of the weed species after it has once infested the land can readily be accomplished at a reasonable cost, and such amounts will also serve to prevent contamination of the area by the weed species for some time.

Many types of weed control chemicals have been made available in recent years. These fall in general into three classes: the contact herbicides, the translocated herbicides, and the soil sterilants. Contact herbicides kill plant tissues by contact. There is no definite translocation of the weed killer. They may be selective or non-selective, depending upon their ability to kill the weeds growing among the crop plants without materially injuring the crop. Nonselective herbicides kill all vegetation, whether weeds or crops. Contact herbicides are applied in the form of sprays and the like in sufficient concentration to kill the plants' top growth. However, although contact herbicides will kill nearly all vegetation upon contact, they have little effect in sterilizing the soil, and hence control only the current plant stand.

Translocated herbicides are usually applied to the leaves or stems of plants, and occasionally to the roots. They are absorbed by the plant and then distributed therein to the leaves, buds and root tips where they accumulate and as a result kill the plants.

The soil sterilants make the soil incapable of supporting plant growth. The sterilization, however, usually is temporary. Even the so-called "permanent" sterilization effects must be repeated yearly or more frequently to maintain sterility. Sodium chlorate is an outstanding example of a soil sterilant, but its soil sterilant activity is very temporary, and has to be renewed at intervals of several months. Moreover, chlorates are not too effective against the fairly shallow-rooted perennial grasses and annual seedling regrowth, due to rapid leaching of the chlorate from the surface. They are useful primarily for deep-rooted and leafy plants, such as buckthorn plantain, yellow star thistle, wild morning glory (bindweed), Canada thistle, and sweetclover.

Herbicidal compositions comprising aminotriazine compounds are known to have considerable activity against grassy and many broad leaf weeds. Weeds against which the aminotriazines have been found effective include chickweed, crabgrass, crowfoot grass, downy broom grass, foxtail (green), goosegrass, knotweed, quackgrass, quickweed, ragweed, stinkgrass, wild buckwheat, wild mustard, and witchgrass.

These compounds are in the nature of soil sterilants, since they prevent weeds from getting started, and are administered as pre-emergence treatments. The chemicals are practically insoluble in water and remain in the upper soil level, thereby affecting germinating weed seeds. Their low solubility also adds to their residual action. However, these compounds are not capable of giving either prompt or complete control of an entire weed stand, unless relatively high, and therefore expensive, application rates are used.

In Patent No. 2,709,648, dated May 31, 1955, Ryker et al. suggest a number of herbicidal combinations employing N-aryl urea compounds. These compounds are known to be effective against obnoxious grasses, i.e., nutgrass, wild oats, Johnson grass, Bermuda grass and the like, but they are not effective as soil sterilants and they are not very effective against deep-rooted and leafy plants. These herbicides can be classified as of the hormonal and contact type. Ryker et al. propose to use them with other herbicidally active compounds of the same type, that is, of the normal and contact type. These combinations, however, are not effective in complete control or even complete removal or extermination of the weed species.

In Patent No. 2,847,293, patented August 12, 1958, Harris et al. describe plant growth control compositions composed of an N-aryl urea and an alkali metal chlorate. This is a combination of a soil sterilant with a herbicide of the contact or hormonal type. These compositions are exceptionally effective against the broad spectrum of weeds, and are capable of completely exterminating all weed growth in the treated soil for a period of upwards of one year. This complete and long-lasting sterilization, very useful to railroads and like users, is obtained with very small amounts of the N-aryl urea and of the chlorate. The synergistic effect which is obtained is unique in the herbicidal art, so far as is now known. The synergism is demonstrated by the fact that the chlorate, which is a soil sterilant but gives a soil sterilization of very temporary nature, is made to give a soil sterilization of a very lasting nature by the N-aryl urea compound, which does not alone display soil sterilant effects except in very large quantities, too large to be practicable economically.

In accordance with the instant invention, an alkali metal chlorate is combined with an aminotriazine compound to give a herbicidal combination that is more effective against weeds of all types, including grasses and deep-rooted and leafy plants, than either herbicide alone. This enhanced effectiveness is particularly demonstrated in the promptness of the herbicidal effect, and in the duration of the treatment. The herbicidal effect is manifested as a soil sterilant primarily, but the effect in killing growing plants is also outstanding.

This enhanced effectiveness is particularly surprising, inasmuch as the chlorates and the aminotriazines are not equally effective against the same plants, and when used alone are not fully effective against many plants. Entire plant stands not controlled by either herbicide alone can however be controlled by the combination, and the percent control obtained in the entire stand is more than would be predicted from the percent control that can be obtained by either herbicide alone in much larger amounts. Complete sterlization enduring for more than one year is obtainable.

Only a small amount of the aminotriazine is required to considerably improve the effectiveness of the alkali metal chlorate. An amount of the aminotriazine in excess of approximately 0.25% will demonstrate a true synergistic effect. The effect becomes less marked at amounts beyond 35%. It is generally preferred that the combination of aminotriazine with chlorate comprise from 0.5% to 25% of the aminotriazine, the remainder being alkali metal chlorate, blended if desired with a hygroscopic or fire retardant diluent to reduce the fire hazard, such as an alkali metal pentaborate or metaborate.

The aminotriazine compounds employed in the compositions of the invention are known compounds, and are defined by the formula:

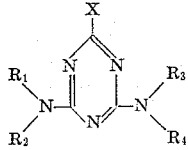

wherein $R_1$, $R_2$, $R_3$, and $R_4$ are selected from the group consisting of hydrogen and saturated or unsaturated branched or straight chain aliphatic hydrocarbon radicals having from one to six carbon atoms, such as methyl, ethyl, isopropyl, butyl, propyl, isobutyl, isoamyl, amyl, tert-butyl, hexyl isohexyl, sec-butyl, allyl, butenyl, and propenyl. Not more than three of $R_1$, $R_2$, $R_3$ and $R_4$ is hydrogen. X is a halogen atom, such as chlorine or bromine. These compounds can be used if desired in the form of their amine salts, formed with inorganic or organic acids, such as hydrochloric acid, sulfuric acid, phosphoric acid, acetic acid, and formic acid. In general, it is preferred that one of $R_1$ and $R_2$ and one of $R_3$ and $R_4$ be alkyl, and the other hydrogen.

The following compounds are typical:

2,4-chloro-6-ethylamino-s-triazine
2-chloro-4,6-bis(allylamino)-s-triazine
2-chloro-4,6-bis(hydroxyethylamino)-s-triazine
2-chloro-4-cyclohexylamino-6-cyclohexyl - methylamino-s-triazine
2-chloro-4,6-bis(piperidyl)-s-triazine
2-chloro-4,6-bis(morpholino)-s-triazine
2-chloro-4-methylamino-6-amino-s-triazine
2-chloro-4-ethylamino-6-amino-s-triazine
2-chloro-4-hydroxyethylamino-6-amino-s-triazine
2-chloro-4-diethylamino-6-amino-s-triazine
2,4,6-tris(ethylamino)-s-triazine
2-amino-4,6-bis(diethylamino)-s-triazine
2-methyl-4,6-bis(amino)-s-triazine
2,4-dichloro-6-n-propylamino-s-triazine
2-chloro-4-ethoxy-6-ethylamino-s-triazine
2-chloro-4,6-bis(benzylamino)-s-triazine
2-chloro-4,6-bis(hydroxyethylamino)-s-triazine
2,4-dihydroxy-6-diethylamino-s-triazine
2-hydroxy-4,6-bis(diethylamino)-s-triazine
2,4,6-tris(ethoxyethoxy)-s-triazine
2-chloro-4,6-bis(ethylamino)-s-triazine
2-chloro-4,6-bis(methylamino)-s-triazine
2-chloro-4-ethylamino-6-methylamino-s-triazine
2-chloro-4-ethylpropyamino-6-ethylamino-s-triazine
2-chloro-4,6-bis(isopropylamino)-s-triazine
2-bromo-4,6-bis(ethylamino)-s-triazine
2-chloro-4,6-bis(n-butylamino)-s-triazine
2-chloro-4,6-bis(n-propylamino)-s-triazine
2-chloro-4,6-bis(diethylamino)-s-triazine
2-chloro-4,6-bis(isoamylamino)-s-triazine
2-chloro-4,6-bis(diisopropylamino)-s-triazine
2-chloro-4,6-bis(dimethylamino)-s-triazine
2-bromo-4,6-bis(isopropylamino)-s-triazine
2-chloro-4-diethylamino-6-ethylamino-s-triazine
2-bromo-4-dimethylamino-6-methylamino-s-triazine
2-bromo-4,6-bis(hexylamino)-s-triazine
2-chloro-4-isopropylamino-6-diethylamino-s-triazine
2-chloro-4-tertiary butylamino-6-ethylamino-s-triazine
2-chloro-4-tertiary butylamino-6-diethylamino-s-triazine
2-chloro-4,6-bis(tertiary butylamino)-s-triazine
2-chloro-4-ethylmethylamino-6-isopropylamino-s-triazine
2-bromo-4,6-bis(isopropylamino)-s-triazine 2-chloro-4,6-bis(ethylamino)-s-triazine is especially preferred. This compound is called "Simazine" in the trade. Also useful are 2-chloro-4-ethylamino-6-diethylamino-s-triazine (Trietazine), 2-chloro-4,6-bis(isopropylamino)-s-triazine (Propazine) and 2-chloro-4-isopropylamino-6-diethylamino-s-triazine (G30031). These compounds are readily prepared by known procedures. Most are easily produced by reacting cyanuric chloride with one to three moles of the corresponding amine, alcohol or mercaptan.

The other active herbicide of the combination is the chlorate, and for this purpose any water-soluble alkali metal chlorate is suitable, sodium and potassium chlorates being preferred. The combination with the chlorate can be made in any desired manner. However, as is well known, sodium and potassium chlorates are highly active oxidizing materials, and therefore it is desirable to blend the chlorate according to known procedures with from 55 to 90% of a water-soluble material known to reduce the fire hazard, such as a hygroscopic material or a fire retardant. Soluble polyborates, such as an alkali metal metaborate $(A_2O(B_2O_3)_x$ where A is an alkali metal and $x$ is a number from 4.16 to 7, such as sodium pentaborate, are preferably used with the chlorate in order to reduce or minimize this hazard. Any chlorate-diluent combinations can be used in admixture with the aminotriazine compound.

Precautions can be taken to avoid segregation of the materials in the mixture by cocrystallizing two or more of the components so that they are present together in the crystals composing the composition. Preferred combinations are of a mixture of from 10 to 45% sodium or potassium chlorate cocrystallized with from 90 to 55% sodium or potassium pentaborate, and of a mixture of from 90 to 55% sodium or potassium metaborate cocrystallized with from 10 to 45% sodium or potassium chlorate, with the aminotriazine compound present during the said cocrystallization so that it is incorporated in the crystals.

Thus, a particularly desirable combination in accordance with the invention is obtained by incorporating the aminotriazine compound in a sodium pentaborate or metaborate and sodium chlorate mixture just before cocrystallization of the sodium pentaborate or metaborate with the sodium chlorate is completely effected.

The sodium metaborate can be prepared first from borax, caustic soda and water, using only the amount of water necessary (together with the water of crystallization in the borax and the water supplied by reaction with the caustic) to supply the water for the hydrated metaborate.

The borax, alkali metal hydroxide and any additional water that is required in the process is placed in the mixture. The ingredients are agitated for a period up to several hours, using only room temperature without application of heat. The mixture goes through several phases and becomes a granular, friable product which is slightly moist. This occurs after a period of about 50 to 60 minutes' mixing at a temperature of about 70 to 80° F. The reaction mixture then is cooled by blowing cold air over it, and agitation and cooling is continued for from one and one-half to two and one-half hours until the batch is almost dry, but not dry enough to be dusty. At this stage the alkali metal chlorate, for example, sodium chlorate, is added, together with the aminotriazine compound. At this point, the reaction mixture should be at a temperature within the range from 32 to 100° F. Cooling then is continued as soon as dusting due to the chlorate has ceased, and agitation is continued until the batch is dry, which usually requires from one-quarter to one-half hour.

The chlorate is extremely soluble and dissolves in the water present in the moist metaborate crystals. Thereafter, the chlorate and metaborate cocrystallize. In the final product, all of the chlorate which is present is cocrystallized with metaborate, and the aminotriazine compound is uniformly dispersed throughout the crystalline mass.

A cocrystallized chlorate-pentaborate mixture can be prepared starting with sodium chlorate and borax. 35½ gallons of boiling water, after which 34½ lbs. of 99½% powdered boric acid is added, followed by 45 lbs. of sodium chlorate. The quantities of borax and boric acid are sufficient to produce 55 lbs. of sodium pentaborate decahydrate. Heating is continued with agitation until the temperature reaches 268° F., after which heating is stopped and the mixture is agitated and rabbled until cold. Alternatively, the sodium chlorate can be added after the temperature of the solution has reached 234° F., after which the mixture is rabbled until cold.

In each case the aminotriazine compound can be added at this stage and rabbling continued until a dry-appearing cocrystallized product, friable and easily ground, is obtained. The yield is 100 lbs. of cocrystallized pentaborate-chlorate mixture containing the desired amount of aminotriazine compound.

Instead of evaporating and rabbling, the mixture can be spray dried.

It is not necessary, of course, that the aminotriazine compound be added at exactly this stage of the process. It can be mixed with the cocrystallized metaborate-chlorate or pentaborate-chlorate. However, it is more difficult at this stage to obtain a uniform mixture in which segregation of the crystals does not occur on standing or shipping. Therefore, incorporating the aminotriazine compound in the mass before complete cocrystallization is preferred.

It is not necessary to mix the aminotriazine compound and the alkali metal chlorate in such a way that both are present in the same crystals, although this is a preferable method since it eliminates possible segregation of the materials and maintains uniformity. Powdered aminotriazine compound and powdered chlorate or powdered cocrystallized chlorate-metaborate or chlorate-pentaborate can be mixed together and sold as such, or the two can be mixed in the aqueous medium and marketed in that form. When a polyborate diluent is to be used with the chlorate, such as a metaborate or a pentaborate, and application is in an aqueous medium, it is possible to utilize a combination of borax and boric acid in the amount stoichiometrically required to produce the desired polyborate. The borax and boric acid will react metathetically in the dispersion or solution to produce the polyborate, and when the solution dries the polyborate will be precipitated with the chlorate and the aminotriazine compound.

Any convenient method of application of the composition of the invention to the weed area can be used. One method involves application of aqueous dispersions or solutions of the composition, by spraying or otherwise. The dry powdered mix of aminotriazine compound and chlorate also may be applied to the area to be treated, and here the aminotriazine compound may or may not be present in the chlorate crystals. Any inert solid carrier or diluent can be incorporated therewith to facilitate application of small amounts to a given area. However, solutions or dispersions in aqueous solvents generally are the most economical and most practical. Suitable compositions also are prepared by mixing or dispersing powdered aminotriazine compound and chlorate with a nonsolvent organic liquid.

Herbicidal dusting compositions can be compounded to give homogeneous free-flowing solids by mixing the aminotriazine compound and alkali metal chlorate with finely divided inert solid carriers, such as talcs, natural clays, pyrophyllite, diatomaceous earth, and flours such as walnut shell, wheat, redwood, soyabean and cottonseed flours. Other inert solid carriers which can be used include magnesium and calcium carbonates, calcium phosphates, lime, etc. either in powder or granular form. The herbicidal materials also can be combined with fertilizers or other materials which are useful for soil-modification purposes.

The percentage by weight of the essential active herbicidal ingredients in the inert solid and liquid carriers will vary according to the manner and rate in which the composition is to be applied. In general, from about 0.5 to 95% by weight of the composition can be herbicidal components.

Aqueous herbicidal compositions contain the aminotriazine compound homogeneously dispersed and the chlorate in solution. A surface-active wetting, dispersing or penetrating agent or emulsifying agent can be used to assist in preparing a stable dispersion of the aminotriazine compound, which is water-insoluble. Such agents are especially desirable when the composition is to be sprayed.

The surface-active wetting, dispersing and penetrating agents can be anionic, cationic or nonionic. Exemplary are the sodium and potassium oleates, morpholine and dimethylamine oleates, sulfonated animal and vegetable oils such as sulfonated fish and castor oils, petroleum sulfonates, sulfonated cyclic hydrocarbons, sodium lignin sulfonate, sodium alkylnaphthalene sulfonates, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, stearyl polyoxyethylene alcohol, octylphenylpolyethylene oxide, polyvinyl alcohols, laurylamine hydrochloride, stearyl trimethyl quaternary ammonium bromide, lauryl pyridinium bromide, cetyl dimethyl benzyl quaternary ammonium chloride, and lauryl dimethylamine oxide. Generally, the surface-active agent will not comprise more than about 5 to 15% of the composition, although more can of course be used, and as little as 0.1% can be used beneficially.

There also may be incorporated in the herbicidal compositions of the invention oils and fats or similar vehicles such as cottonseed oil, olive oil, paraffin oil, hydrogenated vegetable oils, etc. Adhesives such as gelatin, blood albumin, rosin, alkyd resins and the like can be used to increase retention or tenacity of the deposits following application to the plants.

The following examples in the opinion of the inventor illustrate the best embodiments of his invention.

EXAMPLE 1

To 115 lbs. of water in a 200 gallon agitator-equipped mixer, warmed to between 130 and 140° F., is added 15 lbs. of silicate "N" and 270 lbs. of 50% aqueous sodium hydroxide. Agitation is started, and immediately 500 lbs. of octahedral borax pentahydrate is added. Agitation is continued for one hour, after which cooling air is directed across the mixture, and agitation is continued with cooling for one and one-half to two and one-half hours until the batch is almost dry but not dry enough to be dusty. At this stage the temperature is approximately 100° F. The cooling air is turned off and 592 lbs. of sodium chlorate added, followed immediately by 18 lbs. of Simazine (2-chloro-4,6-bis(ethylamino)-s-triazine). Cooling air again is turned on, and the agitation continued with cooling until dusting stops. This requires about thirty minutes. The batch is dumped, and allowed to cure undisturbed for from sixteen to twenty-four hours, after which the material is screened and ground, and packed into containers. This composition contains 1.25% Simazine (2-chloro-4,6-bis(ethylamino)-s-triazine), 57% sodium metaborate $Na_2B_2O_4 \cdot 8H_2O$, 40% sodium chlorate, and about 1.75% inert ingredients.

As a further illustration, two parallel groups of compositions can be made exactly as above, with the addition of from 1.25% to 2.25% Simazine by weight of the composition, at the mixing stage shown. Compositions can be made up containing 22% and 40% sodium chlorate.

A quantity (1393 lbs.) of cocrystallized sodium chlorate-sodium metaborate was made up according to this procedure, without however adding the Simazine. The mixer charge proportions were as follows: water, 115 lbs. silicate "N" 14 lbs., 50% liquid caustic soda, 270 lbs. $Na_2B_4O_7 \cdot 5H_2O$, 500 lbs. sodium chlorate, 580 lbs. This composition contained 40% sodium chlorate. This is the Chlorax "40" used in the succeeding examples.

A second composition was prepared exactly as above but with just over one-half the amount of sodium chlorate. This composition contained 22% sodium chlorate. This is the Chlorax "22" of the succeeding examples.

EXAMPLE 2

A series of test plots along the Minneapolis and St. Louis Railroad track near Kanawha, Iowa, was treated with sodium chlorate, with Simazine, and with mixtures of both the Simazine and sodium chlorate. These tests were made in comparison with CMU (80% 3-p-chlorophenyl-1,1-dimethyl urea), and with and without sodium chlorate, and with and without Simazine-sodium chlorate. The weed stands on these plots included the following:

Common perennials:
  Quack grass
  Common milkweed
  Worled milkweed
  Devil's shoestring
  Ground cherry
  Rose
  Violet
  Dandelion Less common perennials:
  Big bluestem
  Little bluestem
  Slough grass
  Equisetum
  Bluegrass
  Field bindweed
  Field goldenrod
  Four o'clock
  Willow Common annuals:
  Witch grass
  Green foxtail
  Russian thistle
  Prostrate spurge
  Upright spurge Less common annuals:
  Barnyard grass
  Crab grass
  Mexican fireweed
  Common ragweed
  Rough pigweed At the start of the test the plots were covered with a luxuriant growth of the weeds named. The soil during application was moist and the weather clear and cool. Observations of the results in percent weed control were made four months after application. All of the test plots received a treatment with aromatic petroleum oil not containing any herbicides two months after the initial application. The compositions were applied at the rates of 100 lbs. per acre sodium chlorate and of 5 or 10 lbs. of the Simazine or CMU with or without the chlorate in 100 gallons of spray mixture.

*Table I*

| Plot No. | Application rate (lbs. per acre) | | | Percent control |
|---|---|---|---|---|
| | Sodium chlorate | Simazine | CMU | |
| 1 | | 5 | 0 | 56 |
| 2 | 0 | 10 | 0 | 55 |
| 3 | 0 | 0 | 5 | 23 |
| 4 | 0 | 0 | 10 | 70 |
| 5 | 0 | 5 | 5 | 80 |
| 6 | 100 | 0 | 0 | 3 |
| 7 | 100 | 5 | 0 | 75 |
| 8 | 100 | 10 | 0 | 92 |
| 9 | 100 | 0 | 5 | 56 |
| 10 | 100 | 0 | 10 | 78 |
| 11 | 100 | 5 | 5 | 80 |
| 12 | 200 | 0 | 0 | 20 |
| 13 | 200 | 5 | 0 | 90 |
| 14 | 200 | 10 | 0 | 88 |
| 15 | 200 | 0 | 5 | 80 |
| 16 | 200 | 0 | 10 | 95 |
| 17 | 200 | 5 | 5 | 76 |

10 lbs. per acre of Simazine (plot No. 2) gave only 55% control, while 5 lbs. per acre of Simazine gave only 56% control (plot No. 1). (The difference is within experimental error.)

10 lbs. per acre of CMU (plots 3 and 4) was needed to give fair control.

Plot 6 shows that 100 lbs. per acre of sodium chlorate was incapable of giving any control. Even at the rate of 200 lbs. per acre, only very slight control was obtained as shown by plot 12.

The synergistic effect obtained by combining sodium chlorate with the Simazine is shown by plots 7 and 8, where 5 lbs. per acre of Simazine and 100 lbs. per acre of sodium chlorate gave 75% control, and 10 lbs. per acre of Simazine with the same amount of chlorate gave 92% control, far beyond what is obtainable by either of these alone. (Plots 1, 2 and 6.)

This effect was also greater than that obtained by a combination of CMU and sodium chlorate. In plot No. 10, 10 lbs. per acre of CMU and 100 lbs. per acre of sodium chlorate together gave only 78% control, as compared with 92% control for a comparable amount of Simazine and chlorate (plot No. 8). Simazine and CMU together with sodium chlorate (plot No. 11) gave 80% control, the same as is obtainable by the Simazine and CMU alone (plot No. 5) without the sodium chlorate. Thus, no synergism is shown when both the Simazine and the CMU are used together with the sodium chlorate, in contrast to what happens when the sodium chlorate is used with Simazine alone, or with the CMU alone.

Comparable results are shown when the sodium chlorate is used at the rate of 200 lbs. per acre. Whereas the sodium chlorate alone (plot No. 12) gave 20% control, and the Simazine alone (plot No. 1) 56% control, both together (plot No. 13) gave 90% control. Similarly, plot No. 14 shows that the sodium chlorate and Simazine together gave 88% control, as compared with 20% for the sodium chlorate alone (plot No. 12) and 55% for the Simazine alone (plot No. 2). In each case, the effect of using the two together is far more than additive.

On the other hand, plot No. 17 shows that the Simazine and CMU together with sodium chlorate gave no synergistic effect. The result, 76%, was slightly less than that using the Simazine and CMU together (plot No. 5).

The results of this series of experiments show how unpredictable this synergistic effect is, and also how specific, since it is applicable to the Simazine-sodium chlorate combinations, and the CMU-sodium chlorate combinations, but not to combinations of all three.

EXAMPLE 3

A series of treatments were carried out on selected plots along the right-of-way of the Fort Dodge, Des Moines and Southern Railway in the vicinity of Ames, Iowa. The vegetation was made up of the same range of annual and perennial plants as in the Kanawha experiments described in Example 2. No chemical weed control treatments had been applied before the start of this series of tests. The tract was treated by spraying a mixture of 20 lbs. Simazine and 100 lbs. sodium chlorate or 10 lbs. Simazine and 100 lbs. sodium chlorate per 100 gallons of spray mixture per acre. The spray was applied at the start of winter, and read eight months later. The mixture of 10 lbs. Simazine and 100 lbs. sodium chlorate gave 100% control, and the mixture of 20% lbs. Simazine and 100 lbs. sodium chlorate gave 100% control, at the time of reading.

EXAMPLE 4

A series of tests were carried out along the right-of-way of the Spokane, Portland and Seattle Railway near Portland, Orgeon. The weed stands were luxuriant, and included sweet vernal grass, rattail fescue, Kentucky bluegrass, oxeye daisy, buckhorn plantain, St. Johnswort, Canada thistle, bull thistle, common vetch, blackberry, rose and mustard. The surface of the soil at the time of application was dry, and the weather sunny and warm. The weed control compositions were applied in dispersion in 200 gallons of water as a spray, at the rates listed in the table below per acre.

Table II

| Plot No. | Weed control composition | Rate (lbs. per acre) | Percent control After 2 mos. | Percent control After 7 mos. | Weeds eliminated |
|---|---|---|---|---|---|
| 1 | Simazine, granular | 10 | 15 | 15 | Rattail fescue, mustard. |
| 2 | Simazine, spray | 20 | 55 | 40 | Bluegrass, fescue, bull thistle, mustard, vetch and daisy. |
| 3 | Simazine, plus Chlorax "40" | 10, 250 | 87 | 85 | All except plantain, bluegrass and St. Johnswort. |
| 4 | G 30027, spray | 10 | 43 | 45 | Fescue, bluegrass, bull thistle, vetch and mustard. |
|   |   | 20 | 80 | 60 | All except blackberry, Canada thistle and St. Johnswort. |
|   |   | 40 | 99 | 100 | All except Canada thistle, St. Johnswort and blackberry. |
| 5 | G 30027, plus Chlorax "40" | 10, 250 | 83 | 80 | All except plantain, bluegrass, St. Johnswort and blackberry. |

The data show that the chlorate enables 10 lbs. of Simazine or G 30027 to do a more effective job than 20 lbs. when used alone. The loss in effectiveness with time is greater for the Simazine alone (Example 2) than in the combination with chlorate (Example 3). The same is true for G 30027 (Examples 4 and 5).

EXAMPLE 5

A group of plots were laid out along the track of the Western Pacific Railroad (Sacramento and Northern) Fairfield branch, Fairfield, California. The plots were overgrown with a luxuriant growth of weeds, primarily rye grass, California poppy, rattail fescue, wild rye, curly dock and unidentified grass seedlings, with some morning glory and devil's shoestring. The soil was dry one-quarter to one-half inch deep. The weather at the time of application was clear, warm (70° F.) and sunny. There was some rainfall two days following application. The herbicidal compositions were applied in dispersion in water at the rate of 436 gallons of solution per acre. The effect on the weed growth was read three months following application. The table below lists the rate of application and the percent control.

Table III

| Level of Simazine in lbs. active/acre | Level of Chlorax "40" in lb./a. 218 | 436 | 654 | 872 | Means for level of Simazine |
|---|---|---|---|---|---|
| 0 | ¹75.1 | 82.5 | 87.5 | 90.0 | 83.7 |
| 1.45 | 75.0 | 80.0 | 90.0 | 87.5 | 83.1 |
| 2.90 | 85.0 | 85.0 | 97.5 | 94.5 | 90.4 |
| 4.35 | 90.0 | 94.0 | 98.5 | 94.0 | 94.0 |
| 5.80 | 85.0 | 94.5 | 94.0 | 97.5 | 92.7 |
| 7.25 | 90.5 | 97.0 | 99.5 | 99.0 | 96.5 |
| 15.0 | 0 | 0 | 0 | 0 | 50 |
| Means for level of Chlorax "40" | 83.3 | 88.9 | 94.5 | 93.8 | |

¹ Treatment figures are the averages of two replicates.

The data clearly shows the synergistic effect obtainable by the use of Simazine and the sodium chlorate together. The results obtainable are better than for the Chlorax "40" alone, at the same rate, and far better than is obtainable with twice the maximum amount of Simazine, used alone.

EXAMPLE 6

Test plots were laid out containing luxuriant growths of Bouncing Bet (wild phlox) and miscellaneous broadleaf weeds and grasses. Compositions composed of Chlorax "40" and Simazine 50W dispersed in water were applied at the rate of 100 gallons of solution per acre. The weed stands were noted six months after application.

Table IV

| Plot No. | Chemical and rate (lbs./100 sq. ft.) | Percent control Bouncing bet (wild phlox) | Broadleaf weeds | Grasses |
|---|---|---|---|---|
| 1 | Chlorax "40" at ½ lb. plus 3% Simazine 50W | 80 | 80 | 80 |
| 2 | Chlorax "40" at ½ lb. plus 4.8% Simazine 50W | 45 | 80 | 90 |
| 3 | Chlorax "40" at ¾ lb. plus 3% Simazine 50W | 75 | 80 | 90 |
| 4 | Chlorax "40" at ¾ lb. plus 4.8% Simazine 50W | 70 | 90 | 80 |
| 5 | Chlorax "40" at 1 lb. plus 1.25% Simazine 50W | 90 | 90 | 95 |
| 6 | Chlorax "40" at 1 lb. plus 2.0% Simazine 50W | 80 | 95 | 95 |
| 7 | Chlorax "40" at 1½ lb. plus 1.25% Simazine 50W | 75 | 90 | 90 |
| 8 | Chlorax "40" at 1½ lb. plus 2.0% Simazine 50W | 60 | 90 | 95 |

In all of these plots, excellent control of broadleaf weeds and grasses was obtained. The control of Bouncing Bet was exceptionally remarkable, because this weed is scarcely touched by most other herbicides, including combinations of Telvar W and sodium chlorate.

EXAMPLE 7

A test plot composed of tracks 6 through 16 of the St. Cloud yards of the Great Northern Railway were treated with a solution of Methoxone Chlorax plus Simazine. This area constituted approximately fourteen acres. The application rate of Simazine was 7.25 pounds per acre of the Simazine 50W (50% Simazine) and 87.25 lbs. per acre of sodium chlorate. The vegetation was luxuriant at the time of treatment.

The effect of the herbicide was read three months after treatment. The rating of vegetation control was from 85 to 90%. The vegetation showing at the time of inspection was occasional clumps of bluegrass, some regrowth on quackgrass, and an occasional area where crabrass was coming in, with some germination of domestic grains.

The balance of the St. Cloud yard was treated with a standard Methoxone Chlorax No. 4 solution at the rate of 87.25 pounds sodium chlorate per acre. Control at the end of three months was rated at from 75 to 80%.

EXAMPLE 8

A series of test plots along the right-of-way of the Spokane, Portland and Seattle Railroad were treated with a number of herbicidal compositions. These plots were overgrown with a luxuriant growth of weeds, composed predominantly of Sweet vernal grass, rattail fescue, Kentucky bluegrass, seaside bent grass, St. Johnswort, blackberry, Bouncing Bet, common vetch, and Canada thistle. The surface of the soil at the time of application was dry and the weather was sunny and warm. The compositions were applied in aqueous dispersion, and the amounts applied per acre are given in the table below.

Table V

| Plot No. | Materials in lb/acre | | Gallons per acre sprayed |
|---|---|---|---|
| | Chlorax "40" | Simazine 50W (50%) | |
| 1 | 436 | 5.45 | 200 |
| 2 | 436 | 8.71 | 200 |
| 3 | 218 | 10.46 | 100 |
| 4 | 654 | 8.18 | 200 |
| 5 | 654 | 13.10 | 200 |
| 6 | 327 | 9.80 | 100 |
| 7 | 327 | 15.70 | 100 |

The percent control noted two months and seven months after application was as follows:

Table VI

| Plot No. | Percent control of vegetation | | Weeds remaining alive in plot |
|---|---|---|---|
| | After 2 mos. | After 7 mos. | |
| 1 | 75 | 80 | Blackberry, bluegrass, iris. |
| 2 | 90 | 85 | Quackgrass, bluegrass. |
| 3 | 85 | 70 | Quackgrass, velvetgrass. |
| 4 | 95 | 80 | Vetch, bluegrass. |
| 5 | 98 | 85 | Bluegrass, velvetgrass. |
| 6 | 85 | 70 | Bluegrass. |
| 7 | 85 | 80 | Do. |

It is apparent that excellent control is obtainable against all weeds, and this without eliminating bluegrass.

EXAMPLE 9

Test plots in a gravel pit near Goderich, Ontario, Canada, were sprayed with a group of herbicidal compositions composed of Chlorax "40" alone, Simazine 50W alone, and combinations of the two in various amounts. Observations were made on the weed stand at two weeks, three months and one year after application. Applications of the compositions were made using aqueous dispersions of the composition at the rate of 160 gallons of solution per acre. The readings were taken on grasses and broadleaf plants, the former including both annual and perennial grasses and horse tail, and the latter all annual and perennial broadleaf weeds bus excluding brush.

The following results were obtained:

Table VII

| Plot No. | Chlorax "40" (gals./acre) | Simazine 50W (lb./acre) | Percent control | | | | | |
|---|---|---|---|---|---|---|---|---|
| | | | 2 weeks after | | 3 months after | | 1 year after | |
| | | | Grass | Broadleaf | Grass | Broadleaf | Grass | Broadleaf |
| 1 | 70 | | 100 | 100 | 65 | 99 | 25 | 25 |
| 2 | 50 | 5 | 100 | 100 | 92 | 99 | 83 | 94 |
| 3 | 50 | 10 | 90 | 95 | 80 | 97 | 75 | 93 |
| 4 | | 10 | 0 | 0 | 10 | 12 | 25 | 45 |
| 5 | | 20 | 0 | 0 | 40 | 50 | 90 | 85 |

Neither the Simazine nor the Chlorax were capable of giving effective, lasting control during an entire year. The Simazine at the 10 lb. rate gave control of only 25% against grasses and 45% against broadleaf plants after one year, 90 and 85% control was obtainable at the 20 lb. rate, but in neither case was there effective control during the first three months. The Chlorax gave 100% control initially, but only 25% control after one year. Both together, at considerably lesser rates, gave nearly complete control throughout the entire one year test period, both initially and at the end of the period. Thus, the synergistic effect using both together is particularly evident in this series of tests.

EXAMPLE 10

A series of test plots 16½ x 16½ feet were laid out along the right-of-way of the Midland Railroad, Old Cutoff, in the vicinity of Winnipeg, Saskatchewan, Canada. To these test plots were applied as aqueous sprays at the rate of 160 gallons of solution per acre a series of herbicidal compositions containing varying amounts of sodium chlorate and Simazine 50W. The following results were obtained:

Table VIII

| Plot No. | Sodium chlorate (amt. per acre) | Simazine 50W (lb./acre) | Percent control | | | |
|---|---|---|---|---|---|---|
| | | | 3 months after | | 15 months after | |
| | | | Grass | Broadleaf | Grass | Broadleaf |
| 1 | Chlorax [1] 42.5 gal | 4.5 | 60 | 97 | 78 | 83 |
| 2 | do.[1] | 9 | 57 | 86 | 95 | 98 |
| 3 | do.[1] | 18 | 76 | 87 | 100 | 98 |
| 4 | Atlacide [2] 215 lbs | 5 | 58 | 86 | 75 | 76 |
| 5 | do.[2] | 10 | 75 | 96 | 93 | 90 |

[1] Chlorax contained 2.4 lbs. sodium chlorate and 3.48 lbs. sodium metaborate per gallon.
[2] Atlacide is a sodium chlorate herbicide containing 60% sodium chlorate mixed with 40% sodium carbonate as a diluent to overcome the flammability of the chlorate.

Excellent control was obtainable in all cases. Plots 2 and 3 show that 9 lbs. per acre of Simazine is adequate, and that more may be wasteful, in combination with this amount of chlorate.

What is claimed:

1. A plant growth control and herbicidal composition capable when applied in one application at a sufficient rate of imparting both an immediate and a long-lasting soil sterilant effect against the growth of grasses and deep-rooted and leafy plants, said composition comprising as the essential active ingredients an alkali metal chlorate and an amount within the range from about 0.5 to about 35% by weight of the active ingredients of an aminotriazine compound having the formula:

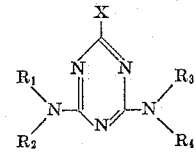

wherein $R_1$, $R_2$, $R_3$ and $R_4$ are selected from the group consisting of hydrogen and aliphatic hydrocarbon radicals having from one to five carbon atoms and not more than three of $R_1$, $R_2$, $R_3$ and $R_4$ is hydrogen, and X is a halogen atom, said herbicidal compounds being in a herbicidal concentration, said herbicidal compounds being mutually activating and producing a synergistic herbicidal effect.

2. A plant growth control and herbicidal composition in accordance with claim 1 in which the chlorate is mixed with an alkali metal metaborate.

3. A plant growth control and herbicidal composition in accordance with claim 1 in which the chlorate is mixed with an alkali metal carbonate.

4. A plant growth control and herbicidal composition in accordance with claim 2 in which the chlorate and metaborate are cocrystallized with the aminotriazine compound.

5. A plant growth control and herbicidal composition in accordance with claim 1 in which the aminotriazine compound is 2-chloro-4,6-bis(ethylamino)-s-triazine.

6. A plant growth control and herbicidal composition in accordance with claim 1 in which the aminotriazine compound is 2-chloro-4-ethylamino-6-diethylamino-s-triazine.

7. A plant growth control and herbicidal composition in accordance with claim 1 in which the aminotriazine compound is 2-chloro-4-isopropylamino-6-diethylamino-s-triazine.

8. A plant growth control and herbicidal composition in accordance with claim 1 in which the aminotriazine compound is 2-chloro-4,6-bis(isopropylamino)-s-triazine.

9. A plant growth control and herbicidal composition in accordance with claim 1 in the form of an aqueous solution.

10. A plant growth control and herbicidal composition in accordance with claim 1 in the form of a solid and incorporating an inert solid carrier, the alkali metal chlorate and the aminotriazine compound together constituting from about 0.5 to about 95% by weight of the composition.

11. A process of controlling the growth of grasses and deep-rooted and leafy plants in soil which comprises applying to the soil a plant growth control and herbicidal composition capable when applied in one application at a sufficient rate of imparting both an immediate and a long lasting soil sterilant effect against the growth of grasses and deep-rooted and leafy plants, said composition comprising as the essential active ingredients an alkali metal chlorate and an amount within the range from about 0.5 to about 35% by weight of the active ingredients of an aminotriazine compound having the formula:

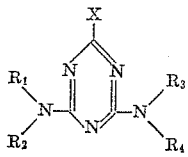

wherein $R_1$, $R_2$, $R_3$ and $R_4$ are selected from the group consisting of hydrogen and aliphatic hydrocarbon radicals having from one to five carbon atoms and not more than three of $R_1$, $R_2$, $R_3$ and $R_4$ is hydrogen, and X is a halogen atom, said herbicidal compounds being in a herbicidal concentration, said herbicidal compounds being mutually activating and producing a synergistic herbicidal effect, the said composition being applied in a sufficient amount to control the growth of said plants.

12. A process in accordance with claim 11 in which the plant growth control and herbicidal composition is applied in the form of an aqueous dispersion.

13. A process in accordance with claim 11 in which the plant growth control and herbicidal composition is applied in the form of a dry powder.

14. A process for controlling the growth of plants comprising applying to soil supporting said plants, in a herbicidally effective amount, a dispersion of an alkali metal chlorate, sodium metaborate and 2-chloro-4,6-bis(ethylamino)-s-triazine.

References Cited in the file of this patent

UNITED STATES PATENTS

| | | |
|---|---|---|
| 2,847,293 | Harris et al. | Aug. 12, 1958 |
| 2,891,855 | Gysin et al. | June 23, 1959 |

FOREIGN PATENTS

| | | |
|---|---|---|
| 1,135,848 | France | May 3, 1957 |

OTHER REFERENCES

Ahlgren: "Principles of Weed Control," John Wiley & Sons, Inc., New York (1952), pages 255 to 258; 264 to 265.